United States Patent
Iwai et al.

(10) Patent No.: US 10,405,236 B2
(45) Date of Patent: Sep. 3, 2019

(54) COMMUNICATION CONTROL DEVICE, COMMUNICATION SYSTEM, COMMUNICATION CONTROL METHOD, AND NON-TRANSITORY COMPUTER-READABLE MEDIUM

(71) Applicant: NEC Corporation, Tokyo (JP)

(72) Inventors: Takanori Iwai, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 15/554,736

(22) PCT Filed: Feb. 12, 2016

(86) PCT No.: PCT/JP2016/000741
§ 371 (c)(1),
(2) Date: Aug. 31, 2017

(87) PCT Pub. No.: WO2016/139900
PCT Pub. Date: Sep. 9, 2016

(65) Prior Publication Data
US 2018/0242197 A1    Aug. 23, 2018

(30) Foreign Application Priority Data
Mar. 4, 2015    (JP) ................................. 2015-042151

(51) Int. Cl.
*H04W 28/12* (2009.01)
*H04W 76/20* (2018.01)
(Continued)

(52) U.S. Cl.
CPC ......... *H04W 28/12* (2013.01); *H04L 47/2466* (2013.01); *H04W 28/0205* (2013.01);
(Continued)

(58) Field of Classification Search
None
See application file for complete search history.

(56) References Cited

U.S. PATENT DOCUMENTS

| 2004/0087306 A1 | 5/2004 | Moulsley et al. |
| 2009/0161611 A1* | 6/2009 | Kuroda ................ H04B 7/2656 370/329 |

(Continued)

FOREIGN PATENT DOCUMENTS

| JP | 2002-535901 A | 10/2002 |
| JP | 2011-250456 A | 12/2011 |

OTHER PUBLICATIONS

3GPP TS 36.331, V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification (Release 12), 410 pages.

(Continued)

*Primary Examiner* — Lonnie V Sweet
(74) *Attorney, Agent, or Firm* — Sughrue Mion, PLLC

(57) ABSTRACT

An object of the invention is to provide a communication control device capable of reducing the effect on throughput of U-Plane data when the communication amount of C-Plane data increases. A communication control device according to the present invention includes: an information acquisition unit configured to acquire ratio information indicating a ratio between a communication amount of control data and a communication amount of user data from a base station configured to allocate a radio resource for transmitting and receiving the control data and the user data between the base station and a mobile station; and a parameter control unit configured to change a parameter associated with the mobile station so as to reduce the control data to be transmitted and received between the mobile station and the (Continued)

base station when the ratio of the communication amount of the control data is larger than a predetermined threshold.

11 Claims, 9 Drawing Sheets

(51) Int. Cl.
  *H04W 76/28* (2018.01)
  *H04W 76/15* (2018.01)
  *H04W 28/02* (2009.01)
  *H04L 12/855* (2013.01)
(52) U.S. Cl.
  CPC ........... *H04W 76/20* (2018.02); *H04W 76/28* (2018.02); *H04W 76/15* (2018.02)

(56) References Cited

U.S. PATENT DOCUMENTS

| | | | |
|---|---|---|---|
| 2009/0168774 A1* | 7/2009 | Soejima | H04W 72/1242 370/389 |
| 2009/0170556 A1* | 7/2009 | Yamasaki | H04L 47/10 455/552.1 |
| 2014/0256331 A1* | 9/2014 | Adachi | H04J 11/003 455/447 |
| 2015/0180629 A1* | 6/2015 | Lorca Hernando | H04J 11/00 370/330 |

OTHER PUBLICATIONS

International Search Report of PCT/JP2016/000741 dated Apr. 26, 2016.

* cited by examiner

COMMUNICATION CONTROL DEVICE, COMMUNICATION SYSTEM, COMMUNICATION CONTROL METHOD, AND NON-TRANSITORY COMPUTER-READABLE MEDIUM

CROSS REFERENCE TO RELATED APPLICATIONS

This application is a National Stage of Application No. PCT/JP2016/000741 filed Feb. 12, 2016, claiming priority based on Japanese Patent Application No. 2015-042151 filed Mar. 4, 2015, the contents of all of which are incorporated herein by reference in their entirety.

TECHNICAL FIELD

The present invention relates to a communication control device, a communication system, a communication control method, and a program. For example, the present invention relates to a communication control device, a communication system, a communication control method, and a program for controlling parameters associated with a mobile station.

BACKGROUND ART

A mobile carrier manages a mobile network and provides users with audio communication and data communication services and the like. In the mobile network, control data necessary for executing data transmission, for example, between users, or between a user and a server, and user data such as audio data, image data, or video data are transmitted and received. The control data is also referred to as C-Plane data, and the user data is also referred to as U-Plane data.

NPL 1 discloses C-Plane data that is transmitted and received between a mobile terminal and a base station. In general, the amount of C-Plane data to be transmitted and received once is about 100 bytes. It is said that the amount of C-Plane data used for handover processing so as to change a base station to be connected with a mobile terminal as a user carrying the mobile terminal with him/her moves is about 150 bytes. Examples of messages used for handover processing include RRC Connection Reconfiguration (including mobilityControlInfo) (Downlink), and RRC Connection Reconfiguration Complete (Uplink). Examples of messages used during normal processing other than handover processing include RRC Connection Request (Uplink), RRC Connection Setup (Downlink), RRC Connection Setup Complete (Uplink), RRC Connection Reconfiguration (not including mobilityControlInfo) (Downlink), and RRC Connection Reconfiguration Complete (Uplink).

CITATION LIST

Non Patent Literature

[NPL 1] 3GPP TS36.331 V12.4.1 (2014-12)

SUMMARY OF INVENTION

Technical Problem

The amount of C-Plane data used for one mobile terminal to execute handover processing is about 150 bytes. However, when a large number of mobile terminals execute handover processing at once, a base station is required to secure a large number of radio resources for the large number of mobile terminals to execute the handover processing. For example, when a large number of people carrying mobile terminals with them are traveling by train, handover processing associated with the travel by train is executed simultaneously by a large number of mobile terminals. In this case, the base station is required to allocate radio resources for transmitting and receiving a large amount of C-Plane data associated with the handover processing. At this time, many of the radio resources, which are limited resources in the base station, are used for transmitting and receiving C-Plane data, which causes a shortage of radio resources for transmitting and receiving U-Plane data. This leads to a problem that an increase in the communication amount of C-Plane data causes deterioration in the throughput of U-Plane data.

An object of the present invention is to provide a communication control device, a communication system, a communication control method, and a program which are capable of reducing the effect on throughput of U-Plane data when the communication amount of C-Plane data increases.

Solution to Problem

A communication control device according to a first aspect of the invention includes: an information acquisition unit for acquiring ratio information indicating a ratio between a communication amount of control data and a communication amount of user data from a base station configured to allocate a radio resource for transmitting and receiving the control data and the user data between the base station and a mobile station; and a parameter control unit for changing a parameter associated with the mobile station so as to reduce the control data to be transmitted and received between the mobile station and the base station, when the communication information indicates that a ratio of the communication amount of the control data is larger than a predetermined threshold.

A communication system according to a second aspect of the present invention includes: a mobile station; a base station configured to allocate a radio resource for transmitting and receiving control data and user data between the base station and the mobile station; and a communication control device including: an information acquisition unit for acquiring, from the base station, communication information determined using a communication amount of the control data and a communication amount of the user data; and a parameter control unit for changing a parameter associated with the mobile station so as to reduce the control data to be transmitted and received between the mobile station and the base station, when the communication information indicates that the communication amount of the control data is larger than a predetermined threshold.

A communication control method according to a third aspect of the present invention includes: acquiring communication information determined using a communication amount of control data and a communication amount of user data from a base station configured to allocate a radio resource for transmitting and receiving the control data and the user data between the base station and a mobile station; and changing a parameter associated with the mobile station so as to reduce the control data to be transmitted and received between the mobile station and the base station, when the communication information indicates that the communication amount of the control data is larger than a predetermined threshold.

A program according to a fourth aspect of the present invention causes a computer to execute: acquiring communication information determined using a communication amount of control data and a communication amount of user data from a base station configured to allocate a radio resource for transmitting and receiving the control data and the user data between the base station and a mobile station; and changing a parameter associated with the mobile station so as to reduce the control data to be transmitted and received between the mobile station and the base station, when the communication information indicates that a ratio of the communication amount of the control data is larger than a predetermined threshold.

Advantageous Effects of Invention

According to the present invention, it is possible to provide a communication control device, a communication system, a communication control method, and a program which are capable of reducing the effect on throughput of U-Plane data when the communication amount of C-Plane data increases.

DESCRIPTION OF EMBODIMENTS

First Embodiment

Figure 1:
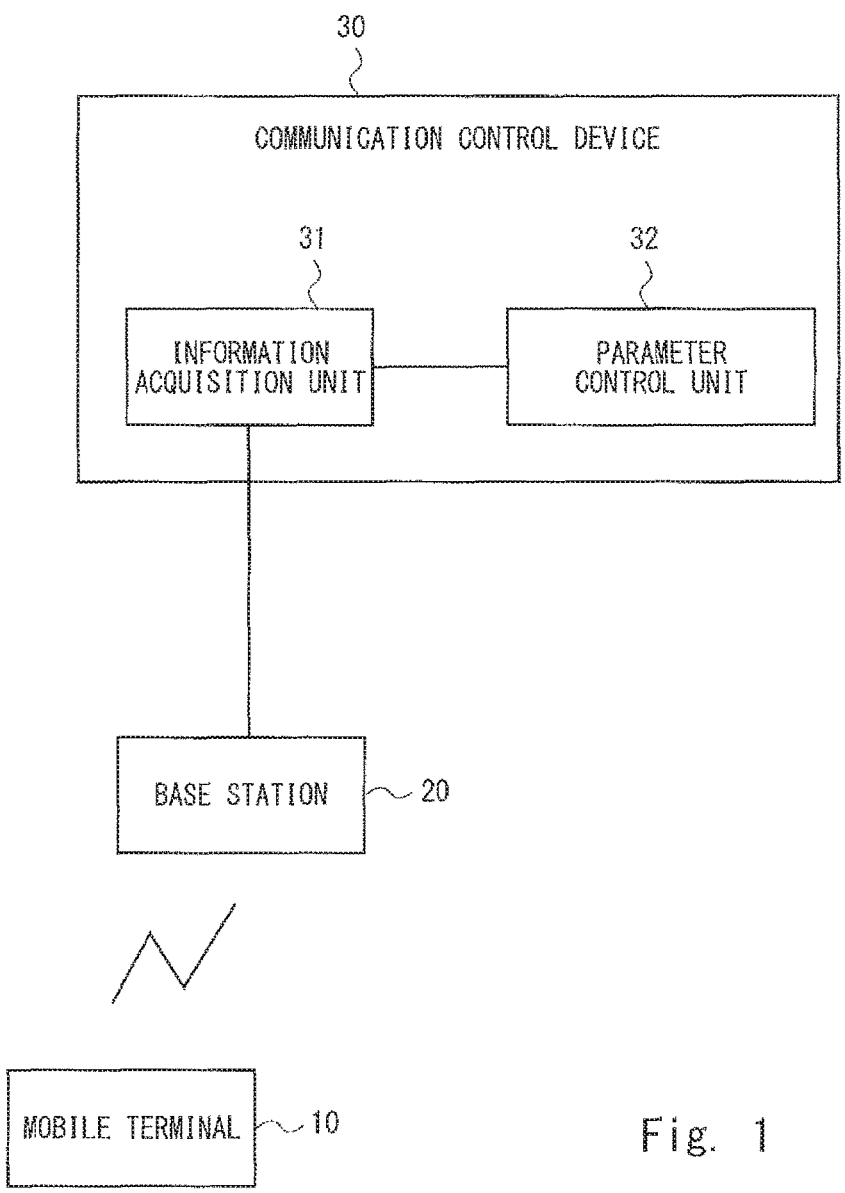
FIG. 1 is a block diagram showing a communication system according to a first embodiment.

Embodiments of the present invention will be described below with reference to the drawings. A configuration example of a communication system according to a first embodiment of the present invention will be described with reference to FIG. 1. The communication system shown in FIG. 1 includes a mobile station 10, a base station 20, and a communication control device 30. The mobile station 10 is, for example, a mobile phone terminal, a smartphone, a tablet, or a computer device such as a personal computer having a communication function. The base station 20 allocates radio resources for transmitting and receiving control data and user data between the base station and the mobile station 10.

The mobile station 10, the base station 20, and the communication control device 30 may be computer devices that are operated by causing a processor to execute a program stored in a memory. Components constituting each of the mobile station 10, the base station 20, and the communication control device 30 may be software, modules, or the like for executing processing by causing a processor to execute a program stored in a memory, or may be formed of circuits or the like.

The base station 20 and the mobile station 10 may perform radio communication using a predetermined communication standard. For example, the predetermined communication standard may be LTE (Long Term Evolution) standard specified in the 3GPP (3rd Generation Partnership project), or may be other standards such as UMTS. Note that in the case of UMTS, a base station control station (RNC) may correspond to the above-mentioned base station.

Next, a configuration example of the communication control device 30 will be described. The communication control device 30 includes an information acquisition unit 31 and a parameter control unit 32. The information acquisition unit 31 acquires, from the base station 20, ratio information indicating a ratio between the communication amount of control data and the communication amount of user data. The ratio information may indicate a ratio between the communication amount of control data and the communication amount of user data in the entire data to be transmitted and received by the base station 20. When the base station 20 communicates with a plurality of mobile stations, the ratio information may indicate a ratio between the communication amount of control data generated in each of the mobile stations and the communication amount of user data.

In this case, the communication amount may be, for example, a message size (content size) of control data or user data, or the number of radio resources to be used when the data is actually transmitted from the base station 20 to the mobile station 10.

The parameter control unit 32 compares the rate of the communication of the control data indicated by the ratio information with a predetermined threshold. The predetermined threshold may be, for example, information that is input by an administrator (e.g., an operator) or the like who manages the communication control device 30.

When the rate of the communication amount of the control data is larger than the threshold, the parameter control unit 32 changes a parameter associated with the mobile station 10 so as to reduce the control data to be transmitted between the mobile station 10 and the base station 20. In other words, the parameter control unit 32 changes a parameter associated with the mobile station 10 so as to reduce or suppress a generation frequency or generation opportunity of the control data between the mobile station 10 and the base station 20. Examples of the parameter associated with the mobile station 10 may include parameters managed by the base station 20, and parameters managed by other devices.

When the rate of the communication amount of the control data is smaller than the threshold, the parameter control unit 32 changes a parameter associated with the mobile station 10 so as to increase or maintain the control data to be transmitted and received between the mobile station 10 and the base station 20. In other words, the parameter control unit 32 changes a parameter associated with the mobile station so as to increase a generation frequency or generation opportunity of the control data between the mobile station 10 and the base station 20, or so as not to suppress the generation frequency or generation opportunity.

As described above, the use of the communication system shown in FIG. 1 enables the communication control device 30 to acquire ratio information indicating a ratio between the communication amounts of control data and user data to be communicated in the base station 20. Further, the communication control device 30 can adjust the amount of the control data to be transmitted and received between the mobile station 10 and the base station 20 to be increased or decreased according to the ratio of the control data.

For example, when the rate of the communication amount of the control data is larger than the threshold, the communication control device 30 can set a parameter for reducing the control data and allocate radio resources, which are available after the control data is reduced, to user data. In this case, the throughput of the user data is improved, so that the communication control device 30 can prevent the throughput of the user data from being deteriorated due to an increase in the control data.

When the communication control device 30 determines that the rate of the communication amount of the control data is smaller than the threshold, the communication control device sets a parameter for increasing the control data, thereby making it possible to perform a call control of more communication terminals. Accordingly, the base station 20 can control more communication terminals and effectively utilize radio resources.

Note that the base station may transmit, to the communication control device, the communication amount of one or both of control data and user data (or quantization information about one or both of control data and user data), together with the ratio information indicating the ratio between the communication amount of the control data and the communication amount of the user data. Instead of the ratio information indicating the ratio between the communication amount of the control data and the communication amount of the user data, information about other communication amounts as described below, for example, may be used.

Comparison information indicating a magnitude relation between the communication amount of the control data and the communication amount of the user data Data amount information indicating the communication amount of the control data and the communication amount of the user data Difference information indicating a difference between the communication amount of the control data and the communication amount of the user data Information including the ratio information, the comparison information, the data amount information, and the difference information, which are determined using the communication amount of the control data and the communication amount of the user data, is referred to as communication information.

Second Embodiment

Next, a configuration example of a communication system according to a second embodiment of the present invention will be described with reference to FIG. 2. The communication system shown in FIG. 2 includes a UE (User Equipment) 11, an eNB (eNodeB) 21, an MME (Mobility Management Entity) 22, and a communication control device 30.

The UE 11 corresponds to the mobile station 10 shown in FIG. 1. The UE 11 is used as a generic term for a mobile station in the 3GPP. The eNB 21 corresponds to the base station 20 shown in FIG. 1. The eNB 21 is a base station that supports the LTE. The MME 22 is a node device that executes, for example, a movement management control of the UE connected to the eNB 21. The MME 22 is a node device that is specified in the 3GPP.

The communication control device 30 may acquire the ratio information indicating the ratio of the communication amount of control data and the communication amount of user data from the eNB 21, and may control the parameter set to the eNB 21 through the MME 22. Alternatively, the communication control device 30 may control the parameter set to the MME 22 to adjust the amount of control data generated between the UE 11 and the eNB 21. The control data in the LTE is referred to as C-Plane, while the control data in this embodiment and other embodiments may be one of the following examples:

(1) Signaling of AS RRC layer;
(2) Signaling of AS RRC layer and Signaling of NAS layer; and
(3) Signaling of NAS layer.

Note that unless otherwise stated, the following description is made assuming the case (2).

Next, a flow of parameter change control processing according to the second embodiment of the present invention will be described with reference to FIG. 3. Assume that data is transmitted and received between the eNB 21 and each of a plurality of UEs connected to the eNB 21 (S11). The state where each UE is connected to eNB 21 indicates a state where, for example, the UE is located in a communication area formed by the eNB 21 and a radio communication line is set in a certain cell in the communication area between the UE and the eNB 21 (RRC_Connected). Data to be transmitted and received between the UE and the eNB 21 includes control data and user data.

To transmit and receive control data and user data between the eNB 21 and each UE, the eNB 21 allocates radio resources for transmitting and receiving the control data and radio resources for transmitting and receiving the user data. Assume herein that the eNB 21 does not manage limited radio resources by separating the radio resources into, for example, radio resources for control data and radio resources for user data. In general, control data is generated unexpectedly in many cases, and the control data is often processed in preference to user data. Accordingly, if it is necessary to transmit or receive control data, radio resources are preferentially allocated to the control data, instead of separating the radio resources into radio resources for control data and radio resources for user data. Radio resources that are not allocated to the control data are used for the user data. By allocating the radio resources as described above, when a large amount of control data are communicated, the radio resources are preferentially allocated to the control data. Accordingly, this causes a shortage of radio resources to be allocated to the user data, which has an adverse effect on the throughput of the user data. The radio resources may be interpreted in a narrow sense, such as radio resources designated by a time and a frequency, or may be interpreted in a broad sense, such as a communication opportunity to be provided to each UE, a frequency band to be allocated, or transmission power. Alternatively, the radio resources may be, for example, the amount of memory used in the eNB 21.

Next, the eNB 21 transmits, to the communication control device 30, a message indicating the usage status of radio resources (S12). The message indicating the usage status of radio resources includes ratio information (or information used instead of the above-mentioned ratio information in the first embodiment) indicating the ratio of the radio resources allocated to the control data and the user data. The ratio information may indicate, for example, the ratio of radio resources allocated to the control data to the entire radio resources in the eNB 21, or the ratio or radio resources to be allocated to the user data. In this case, the usage rate of the entire radio resources may indicate 90%; the radio resources allocated to the control data may be 30%; and the radio resources allocated to the user data may be 60% or the like.

Alternatively, the ratio information may indicate, for example, the ratio between the radio resources allocated to the control data and the radio sources allocated to the user data in the radio resources currently allocated. In this case, the radio resources allocated to the control data is 40%; the radio resources allocated to the user data is 60% or the like; and the total rate is 100%.

Next, the communication control device 30 determines a parameter to be set in the eNB 21 or the UE 11 according to the result of the comparison between the ratio of the radio resources allocated to the control data and the threshold, and transmits a message indicating a parameter change value to the MME 22 (S13). For example, when the ratio of the radio resources allocated to the control data exceeds the threshold, the communication control device 30 transmits, to the MME 22, a message including a parameter value that is changed so as to reduce the control data generated between each UE and the eNB 21. When the ratio of the radio resources allocated to the control data is smaller than the threshold, the communication control device 30 transmits, to the MME 22, a message including a parameter value that is changed to increase the control data generated between each UE and the eNB 21, or a parameter value that is changed to maintain the control data generated between each UE and the eNB 21. Alternatively, when the current communication amount of the control data is maintained, the communication control device 30 may transmit, to the MME 22, a message in which a value that is equal to the currently set parameter value is set.

Next, the MME 22 transmits, to the eNB 21, a message indicating a changed parameter value (or a value that is equal to the currently set value) transmitted from the communication control device 30 (S14). Upon receiving the message transmitted from the MME 22, the eNB 21 sets a parameter value to be included in the message transmitted from the MME 22. Note that as the message transmitted from the MME 22 to the eNB 21, for example, an S1AP MME Configuration Update message, an MME Configuration Transfer message, an E-RAB Setup Request message, or a UE Context Modification message may be used.

Figure 2:
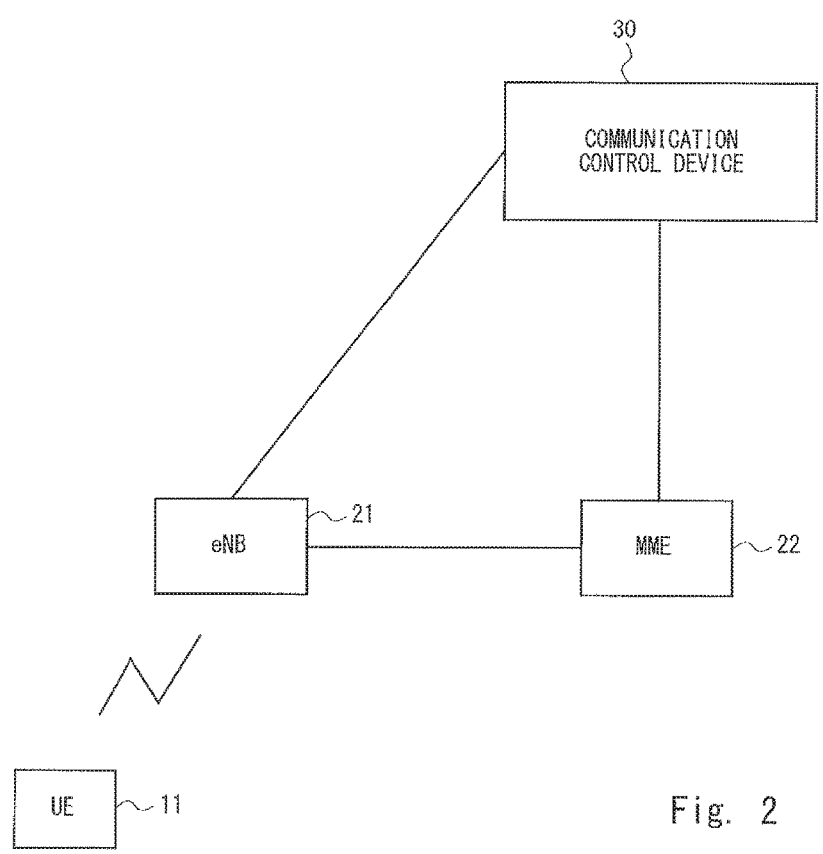
FIG. 2 is a block diagram showing a communication system according to a second embodiment.
Figure 3:
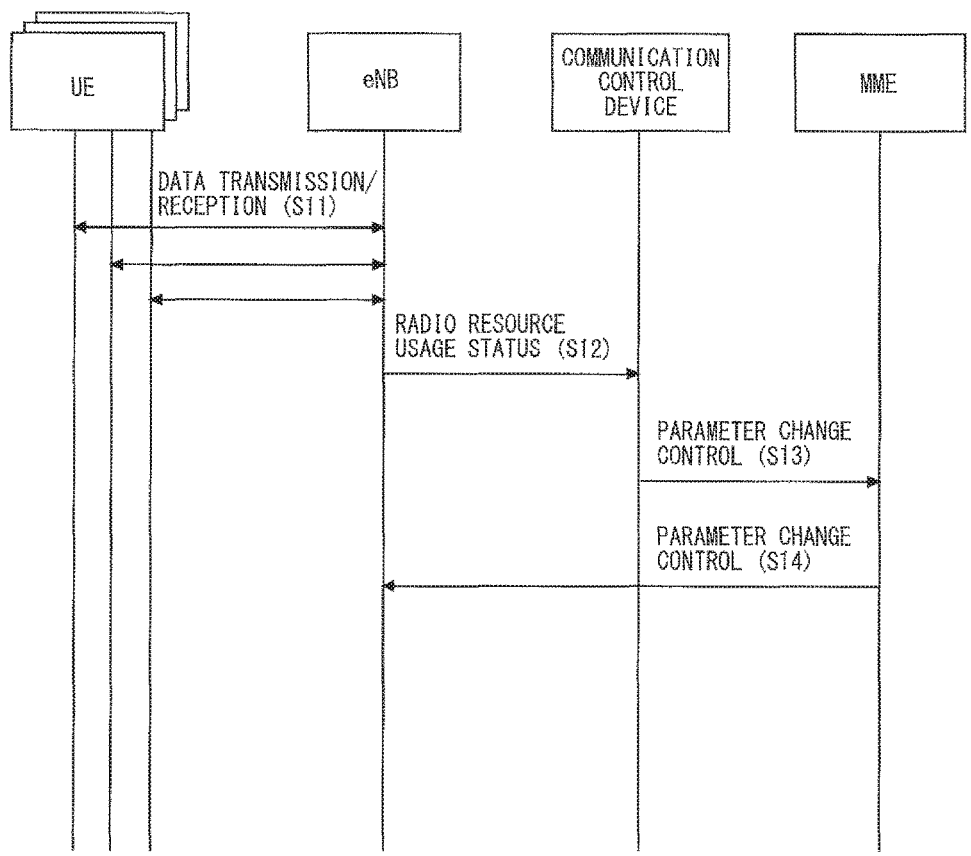
FIG. 3 is a flowchart showing a flow of parameter change control processing according to the second embodiment.

Referring to FIGS. 2 and 3, the communication control device 30 controls the parameter set to the eNB 21 through the MME 22, but instead the communication control device 30 may control the parameter value set to the eNB 21 by directly transmitting a message to the eNB 21.

FIGS. 2 and 3 illustrate the communication control device 30 and the MME 22 as separate devices. However, the MME 22 may have a function executed in the communication control device 30. In other words, the communication control device 30 and the MME 22 may be an integrated device.

Figure 4:
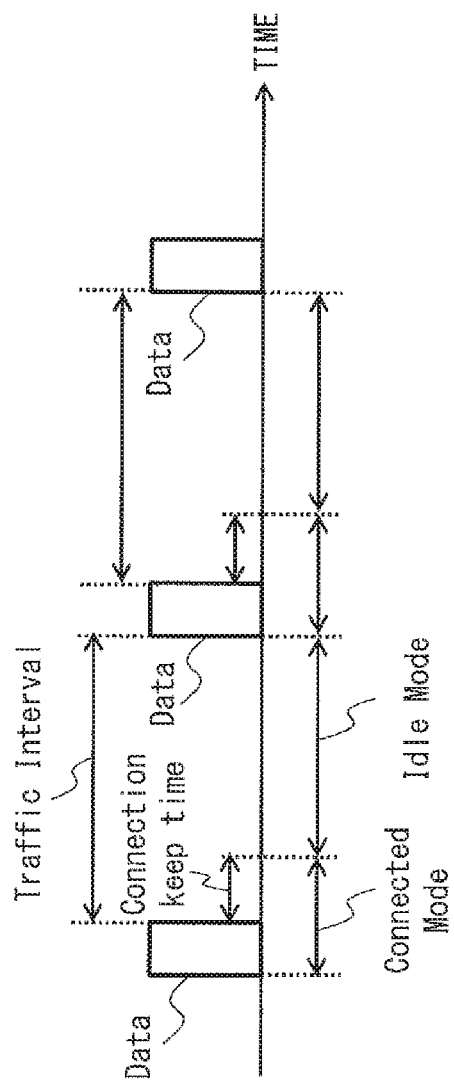
FIG. 4 is a diagram for explaining an Inactivity Timer according to the second embodiment.

A case where an Inactivity Timer is used as a parameter set by the eNB 21 will now be described. The Inactivity Timer will be described in detail with reference to FIG. 4. The horizontal axis in FIG. 4 represents time. Each UE is connected to the eNB 21 for a certain period of time from the transmission of data. An operation to be performed by the UE during this period is referred to as Connected Mode (RRC_Connected). An operation to be performed by the UE during a period in which the UE is not connected to the eNB 21 is referred to as Idle Mode (RRC_Idle). In the eNB, a reference period for determining whether to switch the UE from Connected Mode to Idle Mode after the UE has completed the transmission and reception of data is referred to as (the length of) Inactivity Timer. In other words, Inactivity Timer can be considered to be a period for maintaining the connection in the UE after completion of the transmission and reception of data.

Next, a flow of Inactivity Timer control processing in the communication control device 30 according to the second embodiment of the present invention will be described with reference to FIG. 5. First, the communication control device 30 receives a message indicating a radio resource usage status transmitted from the eNB 21 (S21). Next, the parameter control unit 32 determines whether or not the rate of the control data (C-Plane) is equal to or larger than the threshold (S22). When the parameter control unit 32 determines that the rate of the control data is not equal to or larger than the threshold, the processing is terminated. When the rate of the control data is not equal to or larger than the threshold, it can be estimated that there is no adverse effect on the throughput of the user data due to an increase of the control data. Accordingly, in this case, the processing is terminated so as not to change the currently set parameter to maintain the amount of control data generated between the UE and the eNB 21.

In step S22, when the parameter control unit 32 determines that the rate of the control data is equal to or larger than the threshold, the parameter control unit 32 determines whether or not the rate of a handover control signal in the control data is equal to or larger than the threshold (S23). When the parameter control unit 32 determines that the rate of the handover control signal is not equal to or larger than the threshold, the processing is terminated. In step S23, when the parameter control unit 32 determines that the rate of the handover control signal is equal to larger than the threshold, the parameter control unit transmits, to the MME 22, a message indicating that the value of Inactivity Timer (IA timer) in the eNB 21 is changed to a smaller value (S24).

When the value of Inactivity Timer is changed to a smaller value, the period in which the UE operated in Connected Mode can be shortened. Specifically, when the value of Inactivity Timer is changed to a smaller value, the probability that the UE operated in Idle Mode increases. In a case where the UE operates in Idle Mode, handover processing does not occur even when the UE moves to a communication area formed by another base station. Accordingly, when the value of Inactivity Timer is changed to a smaller value, the occurrence of handover processing can be reduced (suppressed), which results in a reduction in the number of handover control signals.

The handover control signals that can be reduced may be, for example, the following RRC messages to be transmitted and received between a UE and an eNB. That is, RRCConnectionReconfiguration message, and RRCConnectionReconfigurationComplete message. When the occurrence of handover processing is reduced (suppressed), not only the signals to be transmitted and received between a UE and an eNB, but also a Handover Request message, a Handover Request Ack message, and the like to be transmitted and received between a UE and an eNB can be reduced.

Figure 5:
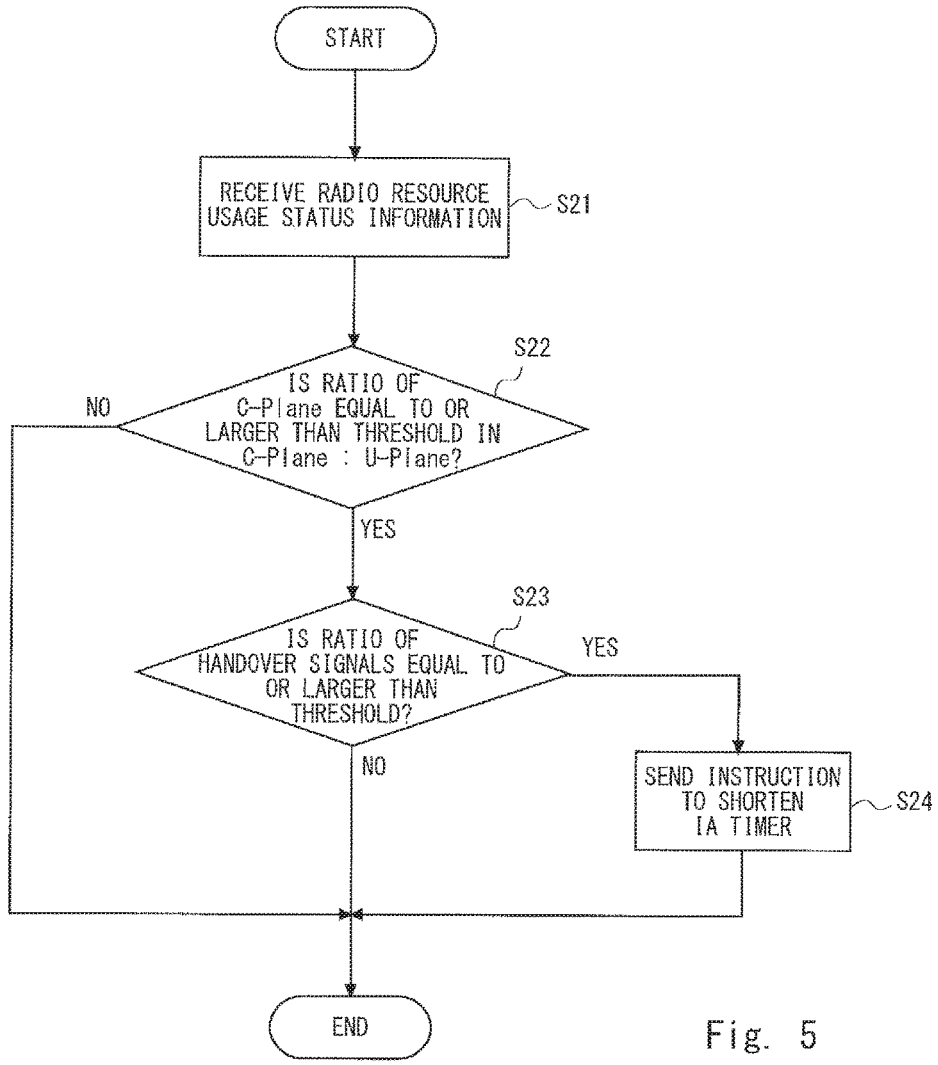
FIG. 5 is a flowchart showing a flow of Inactivity Timer change processing according to the second embodiment.

The processing shown in FIG. 5 becomes effective processing in the eNB in which handover processing concurrently occurs, for example, in the eNB having a communication area including an area through which a train passes.

Next, a flow of Inactivity Timer control processing different from the Inactivity Timer control processing shown in FIG. 5 will be described with reference to FIG. 6. Steps S31 and S32 are similar to steps S21 and S22 shown in FIG. 5, and thus descriptions thereof are omitted.

The parameter control unit 32 determines whether or not the rate of connection/disconnection signals in the control data is equal to or larger than the threshold (S33). When the parameter control unit 32 determines that the rate of the connection/disconnection signals is not equal to or larger than the threshold, the processing is terminated. In step S33, when the parameter control unit 32 determines that the rate of the connection/disconnection signals is equal to or larger than the threshold, the parameter control unit transmits, to the MME 22, a message indicating that the value of Inactivity Timer (IA timer) in the eNB 21 is changed to a larger value (S34).

When the value of Inactivity Timer is changed to a larger value, the period in which the UE operates in Connected Mode can be increased. In a case where the UE operates in Connected Mode, connection/disconnection processing does not occur even when the UE starts communication. Accordingly, when the value of Inactivity Timer is changed to a larger value, the occurrence of the connection/disconnection processing can be reduced, which results in a reduction in the number of connection/disconnection signals.

The connection/disconnection signals may be, for example, an Attach/Detach Request message and an RRC message (e.g., RRC Connection Setup, RRC Connection Release).

Figure 6:
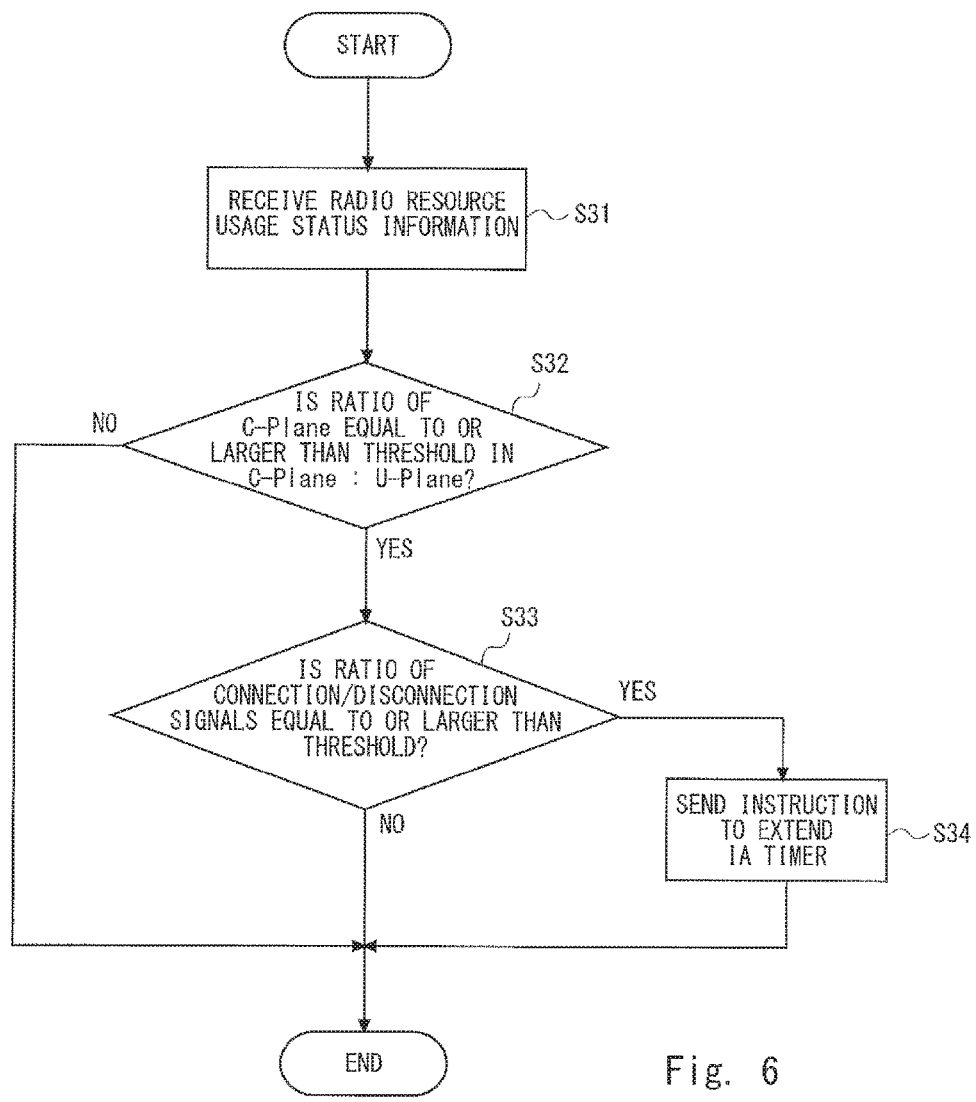
FIG. 6 is a flowchart showing a flow of Inactivity Timer change processing according to the second embodiment.

The processing shown in FIG. 6 becomes effective processing in the eNB that communicates with the UE which does not often move but often generates communication, for example, in the eNB that communicates with a smart meter installed to periodically notify each household of an electricity usage or the like.

Next, a flow of processing when processing using the handover control signal shown in FIG. 5 is combined with processing using the connection/disconnection signal shown in FIG. 6 will be described with reference to FIG. 7. Steps S41 to S44 shown in FIG. 7 are similar to steps S21 to S24 shown in FIG. 5, and thus descriptions thereof are omitted.

In step S43, when the parameter control unit 32 determines that the rate of the handover control signal is equal or larger than the threshold, the parameter control unit determines whether or not the rate of the connection/disconnection signals is equal to or larger than the threshold (S45). When the parameter control unit 32 determines that the rate of the connection/disconnection signals is not equal to or larger than the threshold, the processing is terminated. In step S45, when the parameter control unit 32 determines that the rate of the connection/disconnection signals is equal to or larger than the threshold, the parameter control unit transmits, to the MME 22, a message indicating that the value of Inactivity Timer (IA timer) in the eNB 21 is changed to a larger value (S46).

Figure 7:
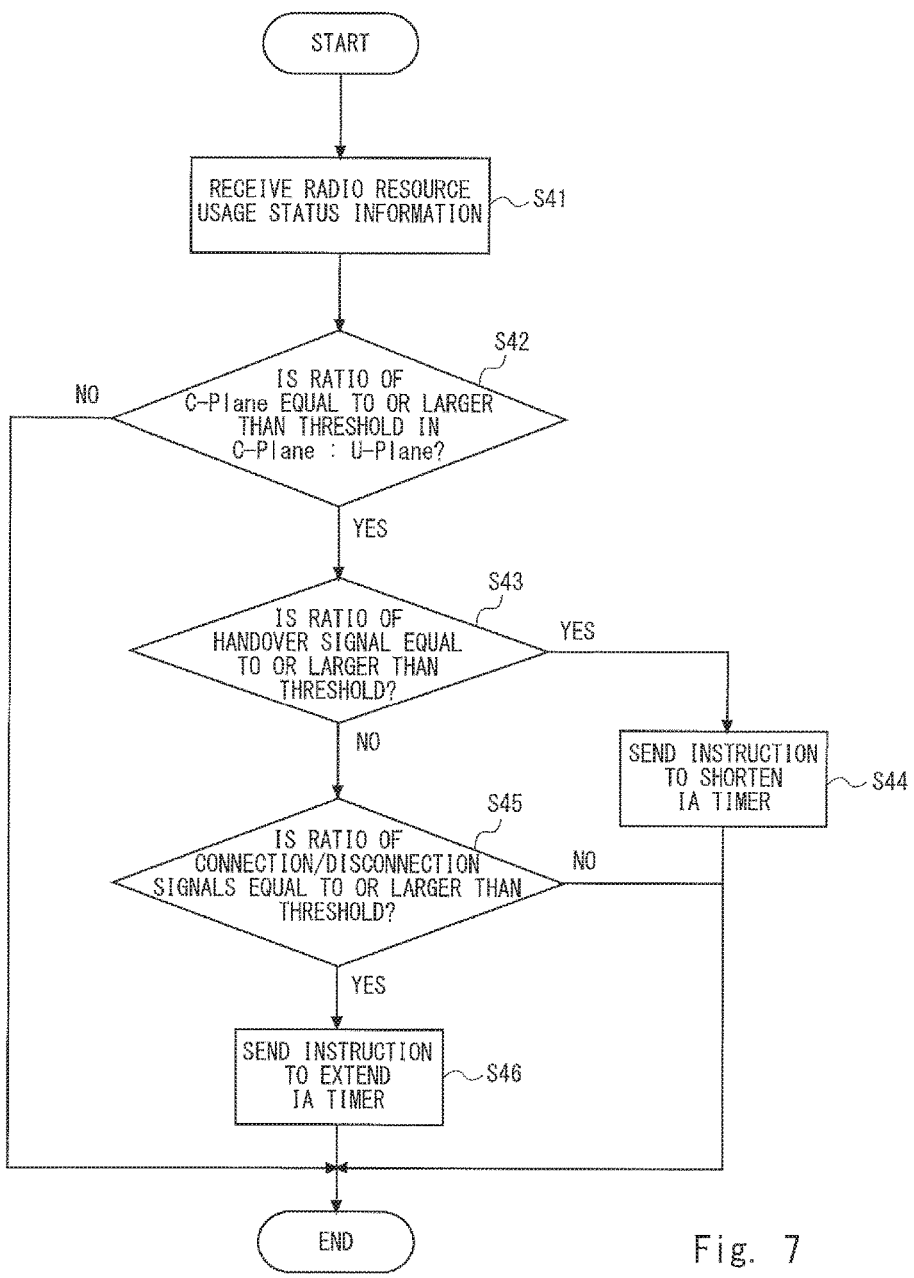
FIG. 7 is a flowchart showing a flow of Inactivity Timer change processing according to the second embodiment.

As shown in FIG. 7, a combination of the processing shown in FIG. 5 and the processing shown in FIG. 6 makes it possible to determine whether or not to shorten or extend the value of Inactivity Timer in each processing. While FIG. 7 illustrates that the processing of S45 is executed after step S43, the processing of S43 may be executed after step S45.

As described above, the use of the communication control device 30 according to the second embodiment of the present invention makes it possible to change the parameter value in the eNB so that the number of pieces of control data generated between the UE and the eNB is reduced according to the rate of radio resources allocated to the control data. When the number of pieces of control data is reduced, the number of radio resources to be allocated to the user data can be increased, so that the effect on the throughput of the user data can be suppressed.

After step S21 shown in FIG. 5, step S31 shown in FIG. 6, and step S41 shown in FIG. 7, the utilization rate of radio resources allocated to control data and user data in the eNB 21 is high, for example, when the utilization rate of the radio resource is 90% or more, the processing of steps S22, S32, S42, and subsequent steps may be executed. Note that the utilization rate of radio resources may be an instant value, or an average value in a predetermined period. The utilization rate of radio resources may be, for example, the utilization rate (total PRB usage) of PRBs (Physical Resource Blocks).

When the utilization rate of radio resources in the eNB 21 is low, it is estimated that there is no concern about deterioration in the throughput in the eNB 21, and the processing of steps S22, S32, S42, and subsequent steps is not executed, so that a processing load on the communication control device 30 can be reduced. The threshold used for executing the processing of steps S22, S32, S42, and subsequent steps is not limited to 90%, and can be arbitrarily set by an administrator or the like.

Third Embodiment

Figure 8:
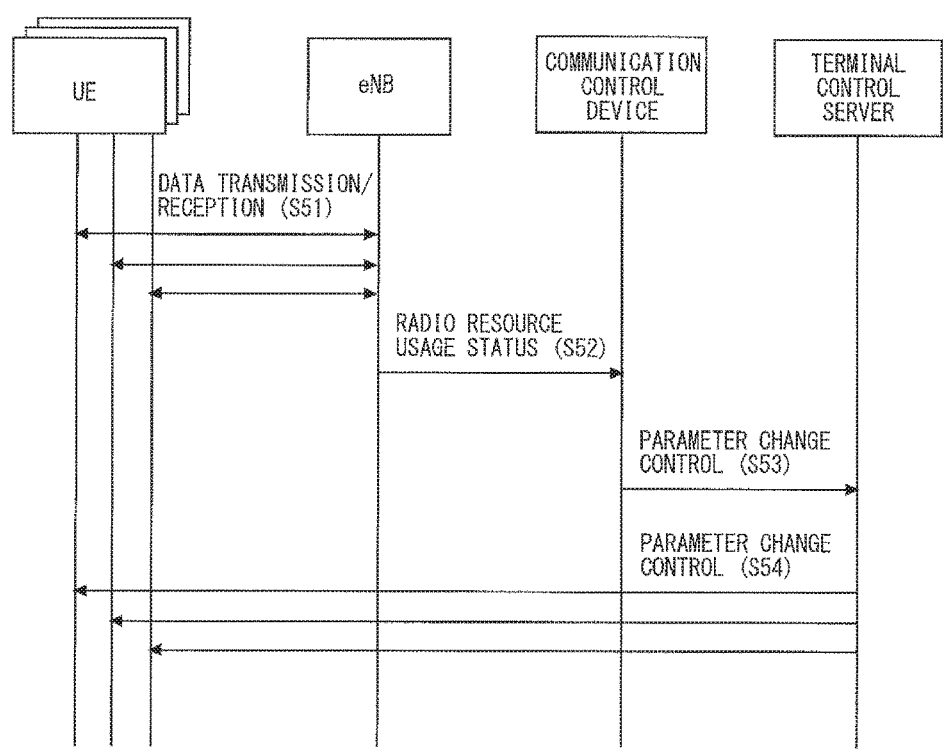
FIG. 8 is a flowchart showing a flow of parameter change control processing according to a third embodiment.

Next, a flow of parameter change control processing according to a third embodiment of the present invention will be described with reference to FIG. 8. Steps S51 and S52 shown in FIG. 8 are similar to steps S11 and S12 shown in FIG. 3, and thus descriptions thereof are omitted.

Upon receiving the message indicating the usage status of radio resources transmitted from the eNB 21 in step S52, the communication control device 30 specifies the UE for which the parameter is changed and the changed parameter value according to the result of the comparison between the ratio of radio resources allocated to the control data and the threshold, and notifies a terminal control server of the specified information (S53).

The terminal control server is a device that controls the operation of each UE, and may be, for example, a device that controls a communication interval or the like of each UE. The terminal control server may be, for example, a server that operates as a Web proxy, or an OMA (Open Mobile Alliance) server disposed on an M2M (Machine to Machine) platform.

For example, when the communication control device 30 determines that the rate of the connection/disconnection signals exceeds the threshold as a result of analyzing the message received in step S52, the communication control device specifies the UE that repeats connection and disconnection at a high frequency. Further, the communication control device 30 transmits information about the specified UE to the terminal control server in step S53.

Next, the terminal control server transmits, to a plurality of UEs specified in the communication control device 30, a message indicating that the communication interval, such as a communication interval defined in TCP, is increased (S54).

As described above, the communication control device 30 transmits the result of analyzing the usage status of radio resources in the eNB 21 to the terminal control server, thereby enabling the terminal control server to control the operation of each UE. For example, by controlling the communication interval of each UE to be increased, the number of connection/disconnection signals to be transmitted from the UE to the eNB 21 can be reduced.

The above embodiment illustrates a case where the terminal control server increases the communication interval of each UE, thereby increasing the TCP data rate. However, for example, the communication interval may be controlled in such a manner that the connection at an application level of each UE is increased.

Fourth Embodiment

Next, a flow of parameter change control processing according to a third embodiment of the present invention will be described with reference to FIG. 9. Steps S61 to S64 shown in FIG. 9 are similar to steps S11 to S14 shown in FIG. 3, and thus descriptions thereof are omitted.

Figure 9:
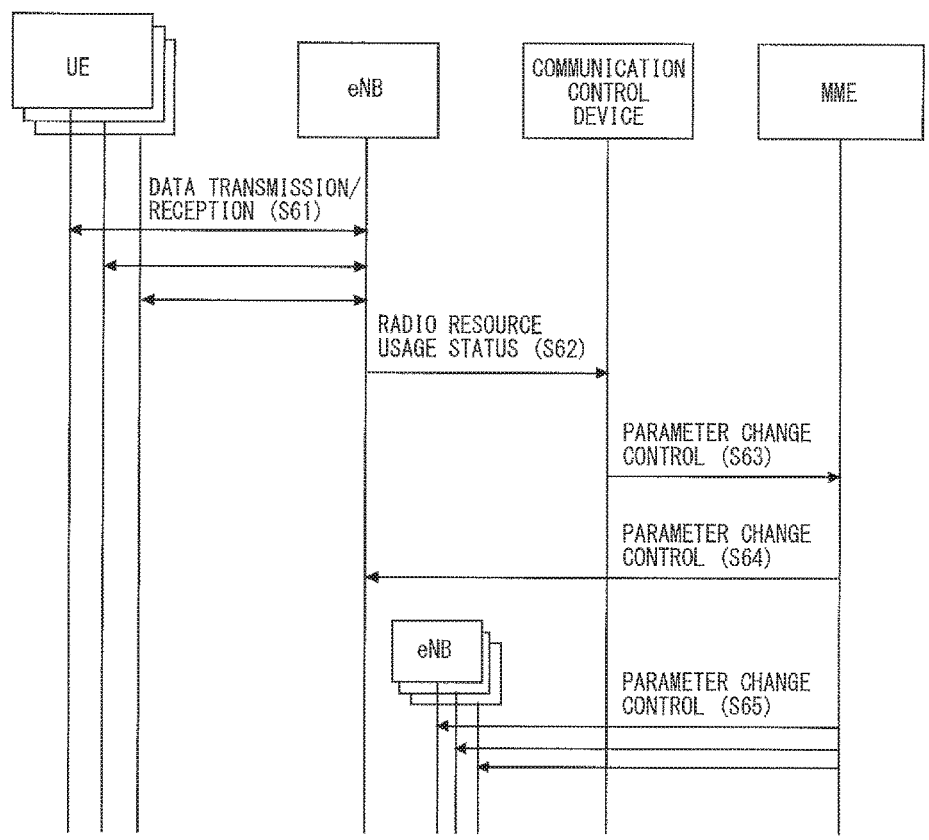
FIG. 9 is a flowchart showing a flow of parameter change control processing according to a fourth embodiment.

FIG. 9 differs from FIG. 3 in that the MME 22 transmits a message indicating a parameter change to a plurality of eNBs located on the periphery of the eNB 21 which has transmitted the message indicating the radio resource usage status in step S62 (S65).

For example, assume that the communication control device 30 has determined that the rate of the handover control signal exceeds the threshold, as a result of analyzing the message received in step S62. In this case, in order to reduce the generation frequency of handover, a communication area (i.e., coverage of a cell) in the eNB 21 which has transmitted the message indicating the radio resource usage status in step S62 may be enlarged, or a communication area in an eNB on the periphery of the eNB 21 may be reduced. With this configuration, the probability of occurrence of handover can be reduced even when the UE located in the communication area of the eNB 21 has moved.

For example, in step S64, the MME 22 may transmit a message indicating that transmission power is increased or indicating that an antenna tilt angle is reduced (narrowed) to the eNB 21, the communication area of which is enlarged. Further, in step S65, the MME 22 may transmit a message indicating that the transmission power is reduced or indicating that the antennal tilt angle is increased (widened) to an eNB on the periphery of the eNB 21 so that the communication area of the eNB on the periphery of the eNB 21 is reduced.

Alternatively, when the communication control device 30 determines that the rate of the handover control signal in the eNB 21 is increased due to a movement of a mobile station into the communication area formed by the eNB 21, the communication area in the eNB 21 may be reduced and the communication area of the eNB on the periphery of the eNB 21.

As described above, the communication control device 30 controls the eNB which has transmitted the message indicating the radio resource usage status and eNBs located on the periphery of the eNB, thereby making it possible to control the control data to be transmitted and received between each UE and each eNB to be reduced.

Fifth Embodiment

Next, information indicating a radio resource usage status according to a fifth embodiment of the present invention will be described. The above embodiments illustrate an example in which the eNB 21 mainly transmits the usage status of radio resources of the entire device, that is, the entire device transmits a message indicating statistics information to the communication control device 30. Specific information to be transmitted to the communication control device 30 when the eNB 21 transmits information indicating the radio resource usage status of each UE to the communication control device 30 will now be described.

For example, the eNB 21 may transmit, to the communication control device 30, a ratio between C-Plane data and U-Plane data, a frequency of generation of C-Plane data, a handover frequency, a movement speed of a UE, positional information of a UE, or the like for each UE located in the communication area, as the information indicating the radio resource usage status. The eNB 21 may estimate, for example, the handover frequency for each UE, from UE history information delivered between eNBs during X2 handover.

The communication control device 30 may adjust the value of Inactivity Timer set to each UE by using information of each UE transmitted from the eNB 21. For example, in a case where the movement speed of each UE is used, when the load on the eNB that forms a communication area of a destination of the UE is high, the communication control device 30 may change the value of Inactivity Timer of the UE to a smaller value, and may reduce the load associated with the handover processing in the eNB that forms the communication area of the destination. At this time, a time required for the UE to reach a communication area different from the current communication area may be estimated from the movement speed of the UE, and when the UE reached a different communication area, the value of Inactivity Timer may be controlled so that the UE operates in Idle Mode.

Further, the communication control device 30 may specify the eNB or UE for which the parameter is to be changed, by using the information indicating the radio resource usage status transmitted from a plurality of eNBs including the eNB 21.

Further, the communication control device 30 may acquire, from the eNB 21, information indicating the radio resource usage status for each cell formed by the eNB 21. The eNB 21 forms a plurality of cells. Accordingly, the eNB 21 can add up the usage statuses of radio resources for each cell.

For example, the communication control device 30 may cause a UE belonging to another cell to perform a handover to a cell in which the ratio of radio resources allocated to the control data is low in the cell formed by the eNB 21. For example, the communication control device 30 may transmit, to the eNB 21, a message indicating a cell identifier (Cell ID) of a cell as a target (connection destination) of handover by the UE performs handover, and may request the UE to send a handover instruction according to the instruction.

Further, the communication control device 30 may receive a message indicating the radio resource usage status from a base station of a system using a communication system different from the LTE. For example, the communication control device 30 may cause the UE to perform a handover to a system in which the ratio of control data is low. For example, the communication control device 30 may transmit, to the eNB 21, a message indicating a system (RAT) as a target (connection destination) of handover by the UE, and may request the UE to send a handover instruction according to the instruction.

As described above, in the fifth embodiment of the present invention, the eNB can transmit, to the communication control device 30, information indicating various radio resource usage statuses, for example, for each UE or each cell. Accordingly, the communication control device 30 controls parameters not for each eNB, but for each UE or each cell, thereby making it possible to control the control data to be transmitted and received between each UE and each eNB to be reduced.

Sixth Embodiment

Next, an example of control parameters according to a sixth embodiment of the present invention will be described. The above embodiments mainly illustrate an example in which a parameter set to an eNB or a UE is controlled to be changed. However, a parameter that is set to an HSS and an MME and is capable of reducing control data between the UE and the eNB by changing the parameter may be changed.

For example, the communication control device 30 may change a position registration interval (Subscribed Periodic RAU/TAU Timer) which is a parameter to be managed in the HSS. For example, the amount of control data to be transmitted from a UE can be reduced by increasing the position registration interval of the UE.

Further, the communication control device 30 may change a position registration area (Tracking Area List), an intermittent reception interval (UE Specific DRX Parameters), and a position registration interval (Subscribed Periodic RAU/TAU Timer), which are parameters to be managed in the MME. For example, the opportunity for the UE to transmit control data associated with a change in the position registration area can be reduced by increasing the position registration area. Further, the amount of control data to be transmitted and received between a UE and an eNB can be reduced by increasing the intermittent reception interval.

As described above, in order to reduce the amount of control data to be transmitted and received between a UE and an eNB, not only parameters in the UE and the eNB, but also parameters in the HSS and the MME can be changed.

In the embodiments described above, the present invention has been described as a hardware configuration. However, the present invention is not limited to this. According to the present invention, the processing in the communication control device 30 can also be implemented by causing a CPU (Central Processing Unit) to execute a computer program.

In the example described above, the program can be stored and provided to a computer using various types of non-transitory computer readable media. The non-transitory computer readable media include various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R (CD-Recordable, CD-R/W (CD-ReWritable), and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computers through a wire communication path such as an electrical wire and an optical fiber, or a wireless communication path.

Note that the present invention is not limited to the embodiments described above, and can be modified as appropriate without departing from the scope of the invention. Although the above embodiments are described using mainly an eNB and an MME, an SGSN may be used instead of the MME, and an NB, which is a base station which does not support the LTE, may be used instead of the eNB.

While the present invention has been described above with reference to embodiments, the present invention is not limited to the above embodiments. The configuration and details of the present invention can be modified in various ways that can be understood by those skilled in the art within the scope of the invention.

This application is based upon and claims the benefit of priority from Japanese patent application No. 2015-042151, filed on Mar. 4, 2015, the disclosure of which is incorporated herein in its entirety by reference.

REFERENCE SIGNS LIST

10 MOBILE STATION
11 UE
20 BASE STATION
21 eNB
22 MME
30 COMMUNICATION CONTROL DEVICE
31 INFORMATION ACQUISITION UNIT
32 PARAMETER CONTROL UNIT

The invention claimed is:

1. A communication control device comprising:
    at least one memory storing instructions, and
    at least one processor configured to execute the instructions to:
        acquire communication information determined using a communication amount of control data and a communication amount of user data from a base station configured to allocate a radio resource for transmitting and receiving the control data and the user data between the base station and a mobile station; and
        change a parameter associated with the mobile station so as to reduce the control data to be transmitted and received between the mobile station and the base station, when the communication information indicates that the communication amount of the control data is larger than a predetermined threshold
    wherein the communication information includes at least one of ratio information indicating a ratio between the communication amount of the control data and the communication amount of the user data, comparison information indicating a magnitude relation between the communication amount of the control data and the communication amount of the user data, data amount information indicating the communication amount of the control data and the communication amount of the user data, and difference information indicating a difference between the communication amount of the control data and the communication amount of the user data.

2. The communication control device according to claim 1, wherein when the communication information indicates that the communication amount of the control data is smaller than the predetermined threshold, the at least one processor of the communication control device is further configured to execute the instructions to change the parameter to increase or maintain the control data to be transmitted and received between the mobile station and the base station.

3. The communication control device according to claim 1, wherein the at least one processor of the communication control device is further configured to execute the instructions to acquire, as the ratio information, information indicating a ratio between a radio resource allocated for transmitting and receiving the control data and a radio resource allocated for transmitting and receiving the user data.

4. The communication control device according to claim 3, wherein the at least one processor of the communication control device is further configured to execute the instructions to acquire information indicating a ratio of a ratio resource allocated for transmitting and receiving the control data and the user data to radio resources included in the base station.

5. The communication control device according to claim 1, wherein the at least one processor of the communication control device is further configured to executed the instructions to acquire information about a communication amount of control data associated with a handover of the mobile station, or information about a communication amount of control data associated with a connection control between the mobile station and the base station.

6. The communication control device according to claim 5, wherein the at least one processor of the communication control device is further configured to execute the instructions to change a value of Inactivity Timer to a value smaller than a currently set value when the communication amount of the control data associated with the handover to be transmitted and received between the mobile station and the base station is reduced.

7. The communication control device according to claim 5, wherein the at least one processor of the communication control device is further configured to execute the instructions to change a value of Inactivity Timer to a value larger than a currently set value when the communication amount of the control data associated with the connection control to be transmitted and received between the mobile station and the base station is reduced.

8. The communication control device according to claim 5, wherein the at least one processor of the communication control device is further configured to execute the instructions to change the parameter in the base station and a peripheral base station located on the periphery of the base station, the base station having transmitted information about the communication amount of the control data.

9. The communication control device according to claim 5, wherein when the base station is communicating with a plurality of mobile stations, the at least one processor of the communication control device is further configured to execute the instructions to acquire information about the communication amount of the control data for each of the plurality of mobile stations.

10. A communication system comprising:
a mobile station;
a base station; and
a communication control device;
wherein the base station comprises;
at least one memory storing instructions, and
at least one processor configured to execute the instructions to:
allocate a radio resource for transmitting and receiving control data and user data between the base station and the mobile station; and
wherein the communication control device comprises;
at least one memory storing instructions, and
at least one processor configured to execute the instructions to:

acquire, from the base station, communication information determined using a communication amount of the control data and a communication amount of the user data; and
change a parameter associated with the mobile station so as to reduce the control data to be transmitted and received between the mobile station and the base station, when the communication information indicates that the communication amount of the control data is larger than a predetermined threshold;
wherein the communication information includes at least one of ratio information indicating a ratio between the communication amount of the control data and the communication amount it the user data, comparison information indicating a magnitude relation between the communication amount of the control data and the communication amount of the user data, data amount information indicating the communication amount of the control data and the communication amount of the user data, and difference information indicating a difference between the communication amount of the control data and the communication amount of the user data.

11. A communication control method comprising:
acquiring communication information determined using a communication amount of control data and a communication amount of user data from a base station configured to allocate a radio resource for transmitting and receiving the control data and the user data between the base station and a mobile station; and
changing a parameter associated with the mobile station so as to reduce the control data to be transmitted and received between the mobile station and the base station, when the communication information indicates that the communication amount of the control data is larger than a predetermined threshold;
wherein the communication information includes at least one of ratio information indicating a ratio between the communication amount of the control data and the communication amount of the user data, comparison information indicating a magnitude relation between the communication amount of the control data and the communication amount of the user data, data amount information indicating the communication amount of the control data and the communication amount of the user data, and difference information indicating a difference between the communication amount of the control data and the communication amount of the user data.

* * * * *

UNITED STATES PATENT AND TRADEMARK OFFICE
CERTIFICATE OF CORRECTION

PATENT NO. : 10,405,236 B2  
APPLICATION NO. : 15/554736  
DATED : September 3, 2019  
INVENTOR(S) : Takanori Iwai and Hisashi Futaki Page 1 of 1

It is certified that error appears in the above-identified patent and that said Letters Patent is hereby corrected as shown below:

In the Claims

Column 16, Line 14; In Claim 10, delete "it" and insert --of-- therefor

Signed and Sealed this  
Fourth Day of February, 2020

Andrei Iancu  
*Director of the United States Patent and Trademark Office*